(12) United States Patent  
Bridges et al.

(10) Patent No.: US 7,701,559 B2
(45) Date of Patent: *Apr. 20, 2010

(54) ABSOLUTE DISTANCE METER THAT MEASURES A MOVING RETROREFLECTOR

(75) Inventors: Robert E. Bridges, Kennett Square, PA (US); John M. Hoffer, Strasburg, PA (US)

(73) Assignee: Faro Technologies, Inc., Lake Mary, FL (US)

( * ) Notice: Subject to any disclaimer, the term of this patent is extended or adjusted under 35 U.S.C. 154(b) by 303 days.

This patent is subject to a terminal disclaimer.

(21) Appl. No.: 11/756,251

(22) Filed: May 31, 2007

(65) Prior Publication Data

US 2009/0066932 A1 Mar. 12, 2009

Related U.S. Application Data

(62) Division of application No. 11/239,854, filed on Sep. 30, 2005, now Pat. No. 7,352,446.

(60) Provisional application No. 60/614,778, filed on Sep. 30, 2004.

(51) Int. Cl.
*G01C 3/08* (2006.01)

(52) U.S. Cl. ........................ 356/5.1; 356/4.01; 356/4.1; 356/5.01; 356/5.15

(58) Field of Classification Search ....... 356/3.01–3.15, 356/4.01–4.1, 5.01–5.15, 6–22
See application file for complete search history.

(56) References Cited

U.S. PATENT DOCUMENTS

| 3,690,767 A * | 9/1972 | Missio et al. ............... 356/5.08 |
| 4,168,524 A * | 9/1979 | Soltz et al. .................. 701/223 |
| 2003/0020895 A1* | 1/2003 | Bridges ..................... 356/4.01 |

* cited by examiner

*Primary Examiner*—Thomas H Tarcza
*Assistant Examiner*—Luke D Ratcliffe
(74) *Attorney, Agent, or Firm*—Cantor Colburn LLP

(57) ABSTRACT

A laser device and method capable of one or more dimensional absolute distance measurements and/or surface scanning and/or coordinate measurements of a moving external retroreflector or other moving target surfaces without using an incremental interferometer.

10 Claims, 5 Drawing Sheets

ABSOLUTE DISTANCE METER THAT MEASURES A MOVING RETROREFLECTOR

CROSS REFERENCE TO RELATED APPLICATIONS

This is a divisional application of U.S. patent application Ser. No. 11/239,854, filed on Sep. 30, 2005, which claims priority to Provisional Patent Application No. 60/614,778, filed on Sep. 30, 2004, both of which are incorporated by reference.

BACKGROUND

The present disclosure relates to a coordinate measuring device. One set of coordinate measurement devices belongs to a class of instruments that measure the coordinates of a point by sending a laser beam to the point. The laser beam may impinge directly on the point or may impinge on a retroreflector target that is in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest. Exemplary systems for determining coordinates of a point are described by U.S. Pat. No. 4,790,651 to Brown et al. and U.S. Pat. No. 4,714,339 Lau et al.

The laser tracker is a particular type of coordinate-measuring device that tracks the retroreflector target with one or more laser beams it emits. A device that is closely related to the laser tracker is the laser scanner. The laser scanner steps one or more laser beams to points on a diffuse surface. The laser tracker and laser scanner are both coordinate-measuring devices. It is common practice today to use the term laser tracker to also refer to laser scanner devices having distance- and angle-measuring capability. This broad definition of laser tracker, which includes laser scanners, is used throughout this application.

One type of laser tracker contains only an interferometer without an absolute distance meter. If an object blocks the path of the laser beam from one of these trackers, the interferometer loses its distance reference. The operator must then track the retroreflector to a known location before continuing the measurement. A way around this limitation is to put an absolute distance meter (ADM) in the tracker. The ADM can measure distance in a point-and-shoot manner. Some laser trackers contain only an ADM without an interferometer. An exemplary laser tracker of this type is described in Payne, et al U.S. Pat. No. 5,455,670. Other laser trackers typically contain both an ADM and an interferometer. An exemplary laser tracker of this type is described in Meier, et al. U.S. Pat. No. 5,764,360.

One of the main applications for laser trackers is to scan the surface features of objects to determine their geometrical characteristics. For example, an operator can determine the angle between two surfaces by scanning each of the surfaces and then fitting a geometrical plane to each. As another example, an operator can determine the center and radius of a sphere by scanning the sphere surface. Up until this time, an interferometer, rather than an ADM, has been required for the laser tracker to scan. The reason for this is that absolute distance measurements have only been possible on stationary targets. Consequently, to get full functionality with both scanning and point-and-shoot capability, laser trackers have required both an interferometer and an ADM. What is needed is an ADM that has the ability to accurately and quickly scan a moving target. This permits tracker cost to be reduced because the interferometer is no longer needed.

SUMMARY

The above and other problems and disadvantages of the prior art are overcome and alleviated by embodiments the present laser device, which utilizes an absolute distance meter to determine the distance to a moving retroreflector.

A laser device and method is disclosed capable of one or more dimensional absolute distance measurements and/or surface scanning and/or coordinate measurements of a moving external retroreflector or other moving target surfaces without using an incremental interferometer depending upon what the application requires.

The above-discussed and other features and advantages of the present apparatus and method will be appreciated and understood by those skilled in the art from the following detailed description and drawings.

BRIEF DESCRIPTION OF THE DRAWINGS

Referring now to the drawings, wherein like elements are numbered alike in the several FIGURES.

DETAILED DESCRIPTION OF EXEMPLARY EMBODIMENTS

Reference will now be made in detail to exemplary embodiments, examples of which are illustrated in the accompanying drawings.

Figure 1:
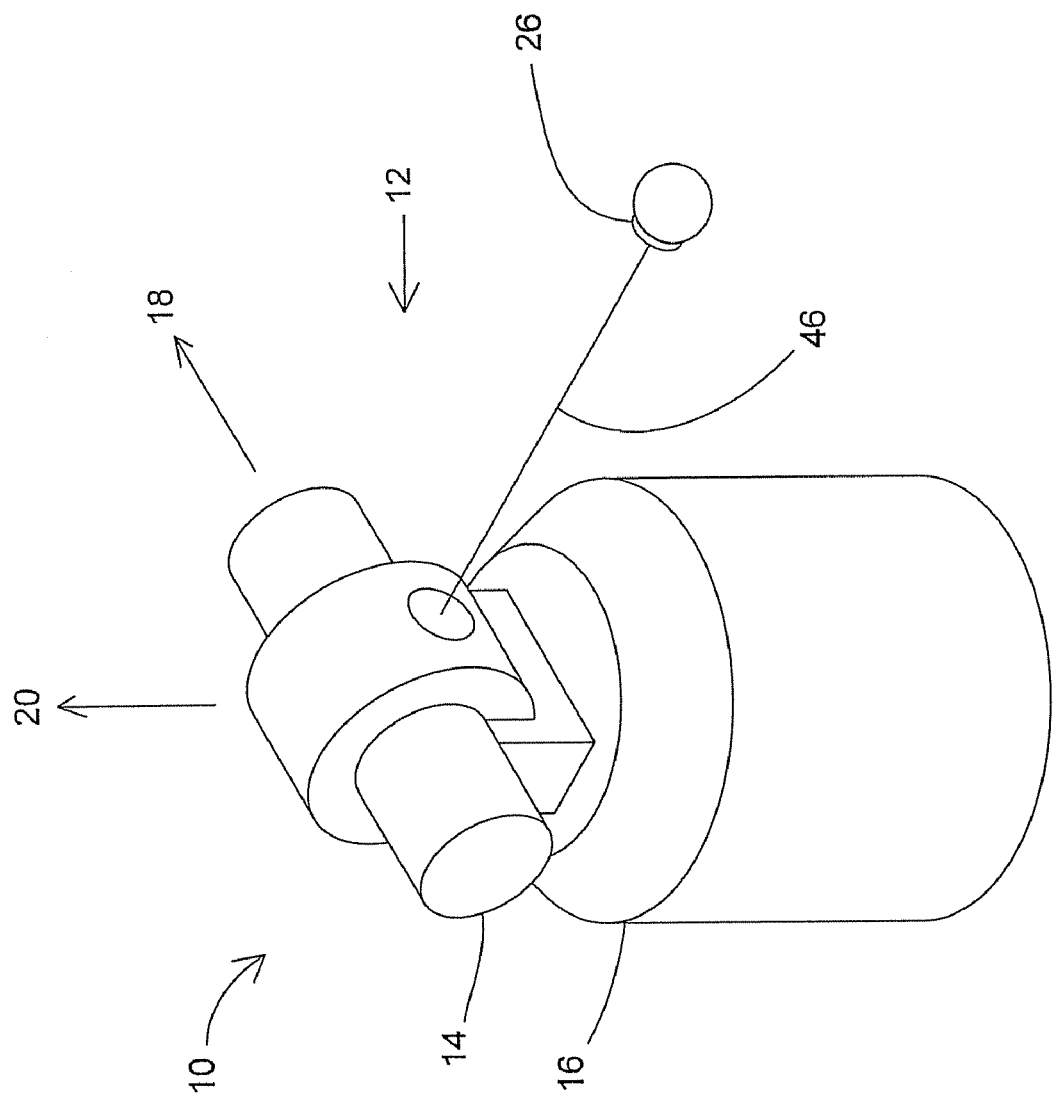
FIG. 1 is a perspective view of an exemplary laser tracker sending a laser beam to an external retroreflector.

An exemplary laser tracker 10 is illustrated in FIG. 1. An exemplary gimbaled beam-steering mechanism 12 of the laser tracker comprises zenith carriage 14 that is mounted on azimuth base 16. The zenith and azimuth mechanical axes internal to the tracker (not shown) are turned to point the laser beam 46 in the desired direction. The laser beam may comprise one or more laser wavelengths, as will be described in the discussion that follows. The zenith and azimuth angular encoders internal to the tracker (not shown) are attached to the zenith and azimuth mechanical axes and indicate, to high accuracy, the angles of rotation. For the sake of clarity and simplicity, this sort of gimbal mechanism 12 is assumed in the following discussion. However, other types of gimbal mechanisms are possible, and the techniques described here are also applicable to these other types.

Laser beam 46 travels to external retroreflector 26. The most common type of retroreflector is a spherically mounted retroreflector (SMR), which comprises a metal sphere into which a cube-corner retroreflector (not shown) is embedded. The cube-corner retroreflector comprises three perpendicular mirrors that come together at a common apex point. The apex point is placed at the center of the metal sphere. Instead of an SMR, a retrosphere or any other device that sends the return laser beam back on itself may be used as the external retroreflector 26.

Elements of the Laser Tracker

Figure 2:
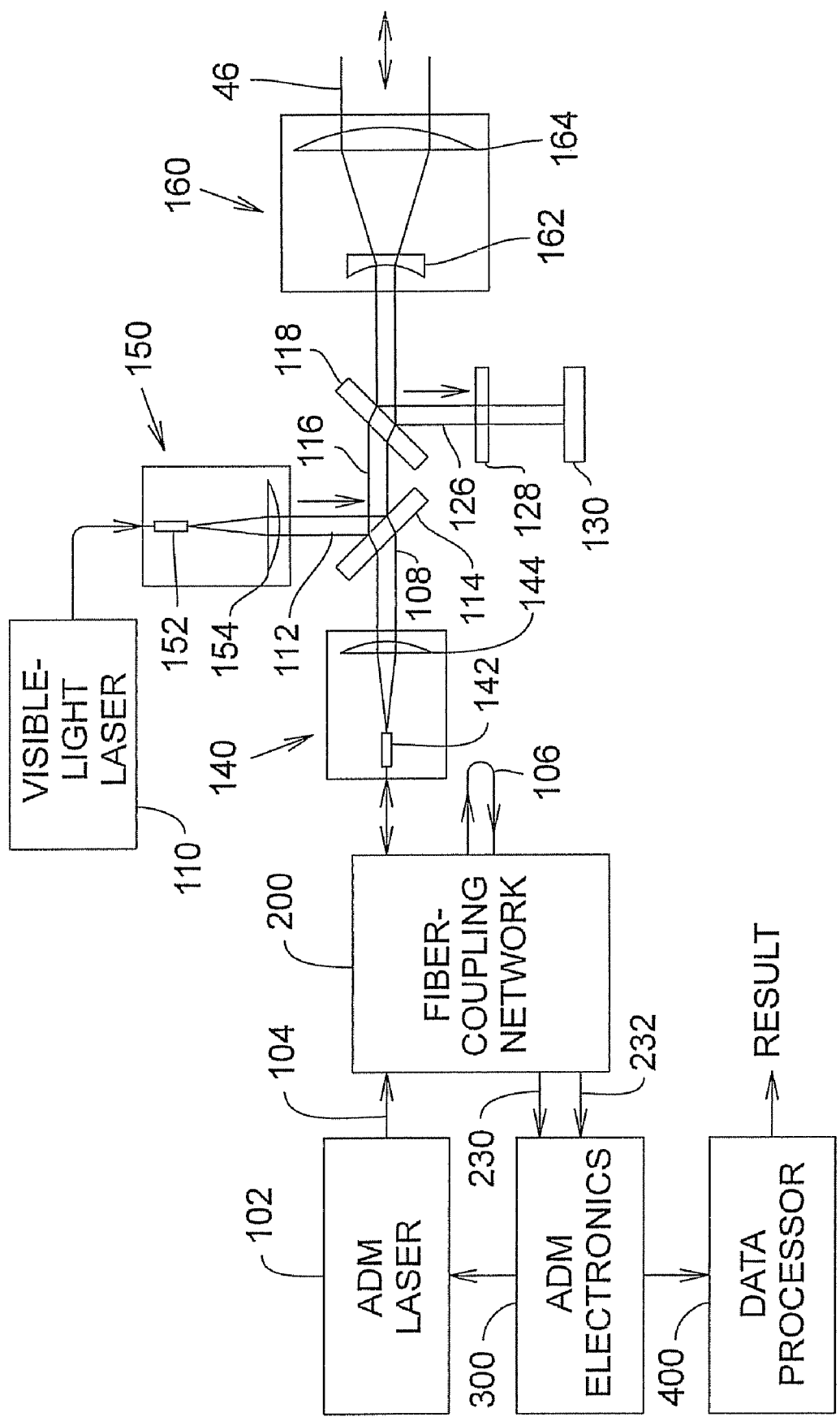
FIG. 2 is a block diagram of some of the main elements within the exemplary laser tracker of FIG. 1.

Some of the main elements within the laser tracker are shown in FIG. 2. ADM electronics 300 modulates the optical power of ADM laser 102, which sends light through fiber-optic cable 104 and fiber-coupling network 200. Some of the light from the fiber-coupling network 200 travels to ADM beam launch 140. Another part of the light travels through fiber loop 106 and then back into fiber-coupling network 200. ADM beam launch 140 comprises stable ferrule 142 and positive lens 144. Collimated light 108 emerges from the fiber launch 140.

In the event that the ADM laser operates at an infrared wavelength, it is convenient to provide a visible laser beam to help make the ADM beam easier to find. Visible-light laser 110 sends visible light into beam launch 150, which comprises stable ferrule 152 and positive lens 154. The visible laser beam 112 that emerges to the beam launch 150 is collimated. Dichroic beam splitter 114 transmits ADM beam 108 but reflects visible beam 112. To the right of beam splitter 114, composite laser beam 116 comprises the visible laser beam and ADM laser beam, which are substantially collinear. Laser beam 116 passes through beam splitter 118 and beam expander 160, emerging as a larger collimated laser beam 46. The beam expander comprises negative lens 162 and positive lens 164.

The laser beam 46 travels to external retroreflector 26, as shown in FIG. 1. The beam reflects off retroreflector 26 and returns to the laser tracker. If the laser beam strikes the center of the retroreflector, the reflected laser beam retraces the path of the incident laser beam. If the laser beam strikes the retroreflector off the center, the reflected laser beam returns parallel to the incident beam but offset from it. The returning laser beam re-enters the tracker and retraces the path back through the optical system. Some of the returning laser light reflects off beam splitter 118. Reflected laser light 126 passes through optical filter 128 and strikes position detector 130. The optical filter 128 blocks either the ADM light or the visible light in the beam 126. The position detector 130 responds to the light that passes through the optical filter 128 by indicating the position of the laser beam on its surface. The retrace point of the position detector is defined as the point that the laser beam 126 strikes if the beam 46 strikes the center of retroreflector 26. When the laser beam 46 moves off the center of retroreflector 26, the laser beam 126 moves off the retrace point and causes the position detector 130 to generate an electrical error signal. A servo system processes this error signal to activate motors that turn the laser tracker toward the center of the external retroreflector 26.

The dichroic beam splitter 114 reflects the returning visible laser beam but transmits the returning ADM laser beam. The returning ADM laser beam travels through the beam launch and is coupled into the optical fiber within the stable ferrule 142. This light travels through the fiber-coupling network 200 and emerges from optical fiber 230. That portion of the laser light that traveled through fiber loop 106 emerges from optical fiber 232. Both fibers 230 and 232 continue into the ADM electronics section 300, where their modulated powers are converted into electrical signals. These signals are processed by the ADM electronics to provide the result, which is the distance from the tracker to the retroreflector target.

Fiber-coupling Network

Figure 3:
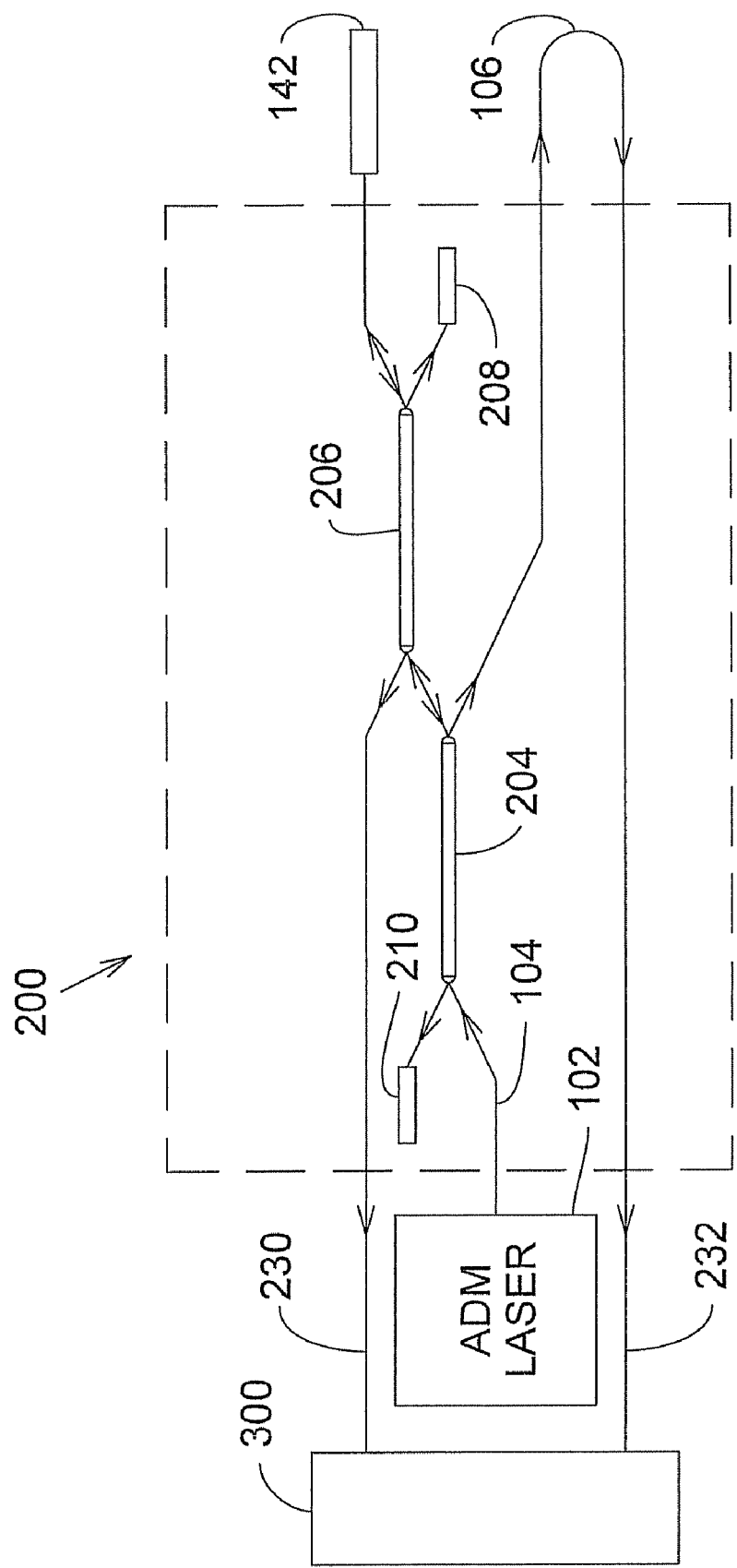
FIG. 3 is a block diagram of the elements within the exemplary fiber-coupling network of FIG. 2.

Exemplary fiber-coupling network 200 of FIG. 3 comprises first fiber-optic coupler 204, second fiber-optic coupler 206, and low-reflection terminations 208 and 210. Light from ADM laser 102 travels through fiber-optic cable 104 and enters first fiber-optic coupler 204. Fiber-optic coupler 204 sends 10% of the laser light through fiber-loop 106 and into optical fiber 232, which travels to ADM electronics 300. Fiber-optic coupler 204 sends the other 90% of the laser light through fiber-optic coupler 206, which sends half of the laser light to low-reflection termination 208 and the other half of the laser light to stable ferrule 142. Light from stable ferrule 142 propagates to external retroreflector 26 and back into ferrule 142, as described above. Half of the laser light returning through ferrule 142 travels back through second fiber-optic coupler 206, through fiber-optic cable 230, and into ADM electronics 300. The other half of the laser light travels through second fiber-coupler 206, first fiber-optic coupler 204, and into ADM laser 102, where it is blocked by an internal Faraday isolator (not shown).

ADM Electronics

Figure 4:
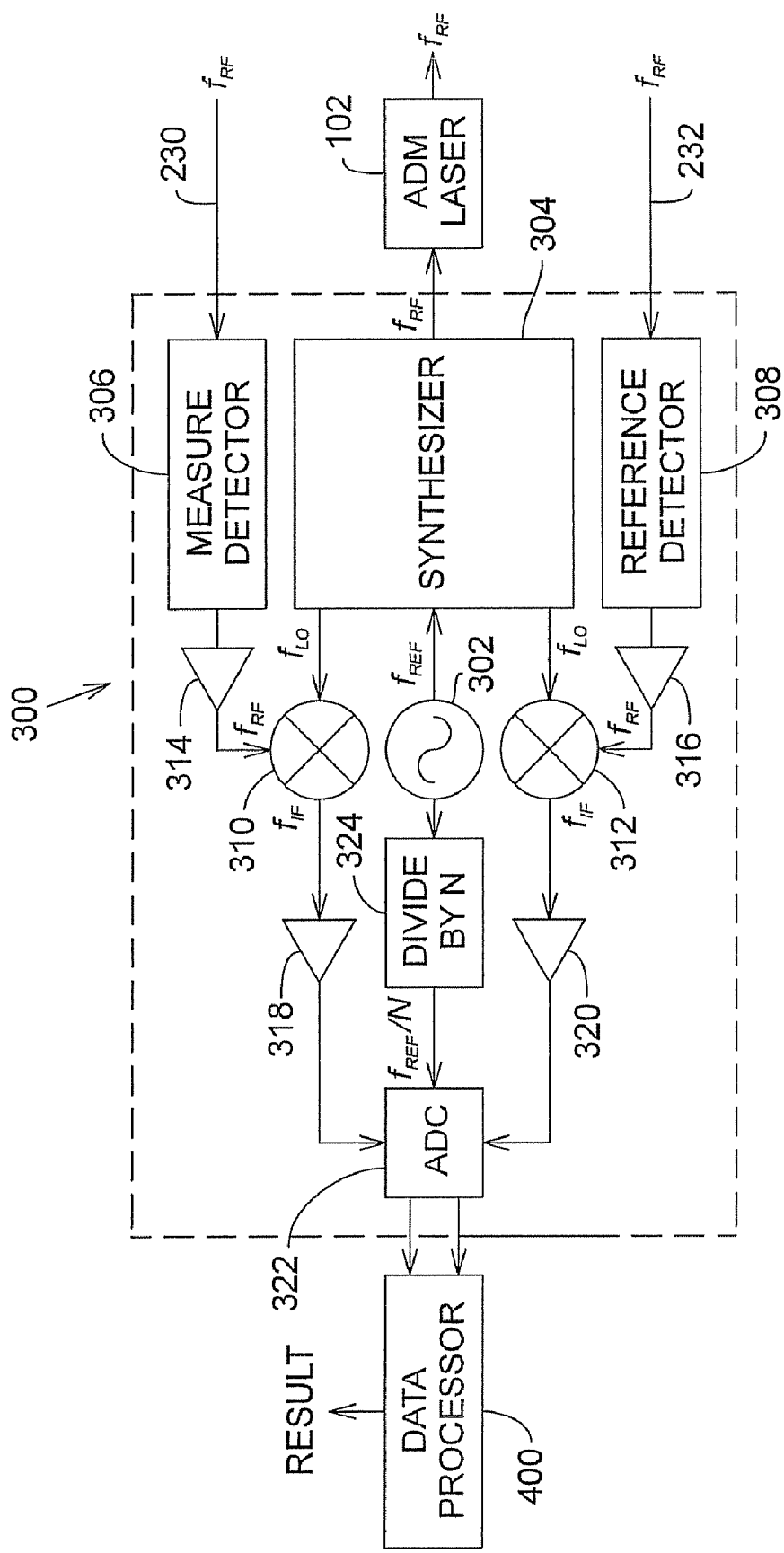
FIG. 4 is a block diagram of the elements within the exemplary ADM electronics of FIG. 2.

ADM electronics 300 of FIG. 4 comprises frequency reference 302, synthesizer 304, measure detector 306, reference detector 308, mixers 310, 312, amplifiers 314, 316, 318, 320, frequency divider 324, and analog-to-digital converter (ADC) 322. Frequency reference 302 provides the time base for the ADM and should have low phase noise and low frequency drift. The frequency reference may be an oven-controlled crystal oscillator (OCXO), rubidium oscillator, or any other highly stable frequency reference. Preferably the oscillator frequency should be accurate and stable to within a small fraction of a part per million. The signal from the frequency reference is put into the synthesizer, which generates three signals. The first signal is at frequency $f_{RF}$ and modulates the optical power of ADM laser 102. This type of modulation is called intensity modulation (IM). Alternatively, it is possible for the first signal at frequency $f_{RF}$ to modulate the electric field amplitude, rather than the optical power, of the laser light from ADM laser 102. This type of modulation is called amplitude modulation (AM). The second and third signals, both at the frequency $f_{LO}$, go to the local-oscillator ports of mixers 310 and 312.

Fiber-optic cables 230 and 232 carry laser light. The light in these fiber-optic cables is converted into electrical signals by measure detector 306 and reference detector 308. These optical detectors send the modulation frequency $f_{RF}$ to amplifiers 314, 316 and then to mixers 310, 312. Each mixer produces two frequencies, one at $|f_{LO}-f_{RF}|$ and one at $|f_{LO}+f_{RF}|$. These signals travel to low-frequency amplifiers 318, 320. These amplifiers block the high-frequency signals so that only the signals at the intermediate frequency (IF), $f_{IF}=|f_{LO}-f_{RF}|$ pass through to the analog-to-digital converter (ADC) 322. The frequency reference 302 sends a signal into frequency divider 324, which divides the frequency of the reference 302 by an integer N to produce a sampling clock. In general, the ADC may decimate the sampled signals by an integer factor M, so that the effective sampling rate is $f_{REF}/NM$. This effective sampling rate should be an integer multiple of the intermediate frequency $f_{IF}$.

Here are frequencies for an exemplary ADM: The frequency reference is $f_{REF}=20$ MHz. The synthesizer RF frequency that drives the laser is $f_{RF}=2800$ MHz. The synthesizer LO frequency that is applied to the mixers is $f_{LO}=2800.01$ MHz. The difference between the LO and RF frequencies is the intermediate frequency of $f_{IF}=10$ kHz. The frequency reference is divided by N=10, to produce a 2-MHz frequency that is applied to the ADC as a sampling clock. The ADC has a decimation factor of M=8, which produces an effective sampling rate of 250 kHz. Since the IF is 10 kHz, the ADC takes 25 samples per cycle.

The ADC sends the sampled data for the measure and reference channels to data processors 400 for analysis. Data processors include digital signal processor (DSP) chips and general-purpose microprocessor chips. The processing performed by these processors is described below.

Data Processor

Figure 5:
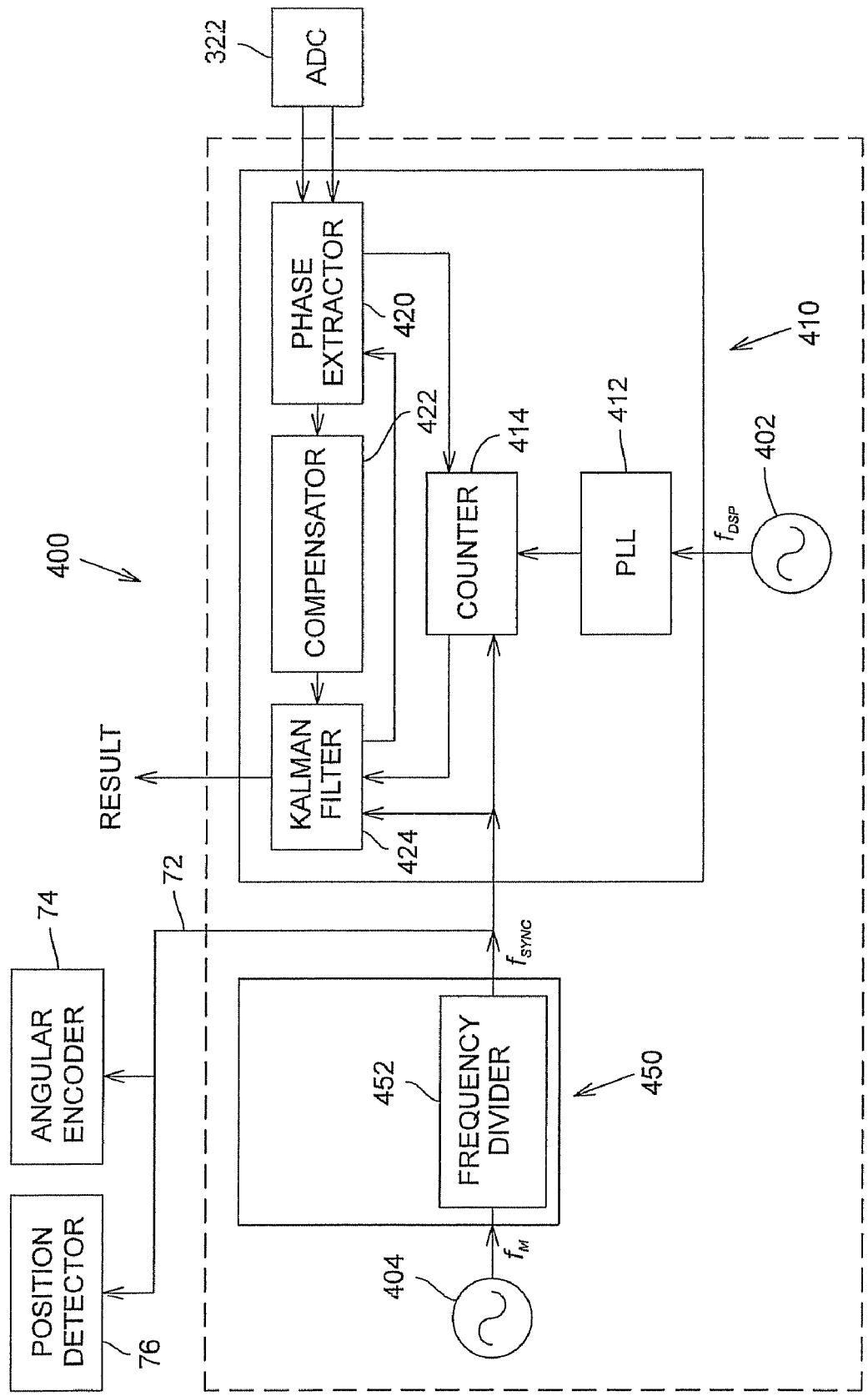
FIG. 5 is a block diagram of the elements within an exemplary ADM data-processing system for computing the distance to a moving retroreflector.

Data processor 400 of FIG. 5 takes the digitized data from ADC 322 and derives from it the distance from the tracker to external retroreflector 26. FIG. 5 refers to this distance as the RESULT. Data processor 400 comprises digital signal processor 410, microprocessor 450, and crystal oscillators 402, 404.

Analog-to-digital converter 322 sends sampled data to DSP 410. This data is routed to a program that runs within the DSP. This program contains three main functions: phase-extractor function 420, compensator function 422, and Kalman-filter function 424. The purpose of the phase-extractor function is to determine the phases of the signals in the reference and measure channels, that is, the phases of the signals that pass through the measure detector 306 and reference detector 308. To determine these phases, the modulation range must first be calculated. Modulation range is defined as the round-trip distance traveled by the ADM laser light in air for the phase of the laser modulation to change by 2 pi radians. The modulation range $R_{MOD}$ is given by $$R_{MOD} = c/(2nf_{RF}), \quad (1)$$

where c is the speed of light in vacuum, n is the group index of refraction of the ADM laser light in air, and $f_{RF}$ is the RF frequency generated by synthesizer 304 and applied to ADM laser 102. In an exemplary ADM having an RF frequency of 2860 MHz, the modulation range is approximately 52 millimeters.

As discussed previously, the sample clock applied to ADC 322 has an effective frequency of $f_{SAMP}=f_{REF}/NM$ and the number of ADC samples per cycle is $V=f_{SAMP}/f_{IF}$. In an exemplary tracker, $f_{REF}=20$ MHz, $N=10$, $M=8$, and $f_{IF}=10$ kHz. The sample frequency is then 250 kHz and the number of ADC samples per cycle is $N_{ADC}=25$ samples per cycle.

Let $x_k$ be the $k^{th}$ sampled data value from the ADC for the measure channel and let v be the corresponding speed of external retroreflector 26 during the measurement. Phase-extractor function 420 calculates the phase PM of the measure channel for moving external retroreflector 26 as follows:

$$a = \sum_{k=0}^{V-1} x_k \sin\left(2\pi k \frac{f_{IF} - v/R_{MOD}}{f_{SAMP}}\right), \quad (2)$$

$$b = \sum_{k=0}^{V-1} x_k \cos\left(2\pi k \frac{f_{IF} - v/R_{MOD}}{f_{STAMP}}\right), \quad (3)$$

$$p_M = \tan^{-1}(a/b). \quad (4)$$

Let $y_k$ be the $k^{th}$ sampled data values from the ADC for the reference channel. Phase-extractor function 420 calculates the phase $p_R$ of the reference channel for moving external retroreflector 26 as follows:

$$g = \sum_{k=0}^{V-1} y_k \sin\left(2\pi k \frac{f_{IF}}{f_{SAMP}}\right), \quad (5)$$

$$h = \sum_{k=0}^{V-1} y_k \cos\left(2\pi k \frac{f_{IF}}{f_{SAMP}}\right), \quad (6)$$

$$p_R = \tan^{-1}(g/h). \quad (7)$$

Significantly, the phase-extractor function 420 is dependent on the speed or velocity v, for example the radial speed, of the target as show in equation (2), (3), (5), and (6). The phase-extractor function 420 also delivers the measure phase PM and the reference phase $p_R$ to the compensator function, which uses these phases to calculate a distance value:

$$d = d_0 + R_{MOD}[W + (p_M - p_R)/2\pi]. \quad (8)$$

The quantity W is an integer that accounts for the number of whole modulation intervals to the target. The method for finding this integer is discussed below. In some systems, there may be additional systematic errors that can be removed by appending additional terms to equation (8). For example, some systems experience an error that varies with distance as a sinusoid with a period equal to the modulation range $R_{MOD}$. To remove this type of error, it is necessary to use the ADM to measure targets at accurately known distances and observe the sinusoidal error pattern.

The compensator 422 sends the distance values to Kalman filter 424. The Kalman filter is a numerical algorithm applied to the distance data to give the best estimate of distance and speed of external retroreflector 26 as a function of time and in the presence of noise. The ADM distance data is collected at high speed and has some level of random noise in the distance readings. This small error is greatly amplified in calculating speed, since small differences in distance are divided by a small increment in time. The Kalman filter can be thought of as an intelligent smoothing function that optimizes accuracy based on the noise of the system and the speed of the target.

The Kalman filter also serves to synchronize the ADM readings with the readings of the angular encoders and the position detector. The angular encoders and position detector latch their readings whenever they receive the sync pulse, which occurs at frequency $f_{SYNC}$. The frequency of the sync pulse is in general different than the frequency of calculation of the ADM. In an exemplary tracker, the ADM calculates at a rate of $f_{IF}=10$ kHz, while the sync pulse has a frequency of 1.024 kHz. The Kalman filter provides synchronization of the ADM with the angular encoders and position detector by extrapolating the position forward in time to the next sync pulse.

There are five general equations that govern the behavior of the Kalman filter. In general, the quantities in these equations are represented by matrices, whose dimensions are determined by the complexity of the implementation of the Kalman filter. The five general equations are $$x_m = \Phi x_p, \quad (9)$$

$$P_m = \Phi P_p \Phi^T + Q, \quad (10)$$

$$K = P_m H^T (H P_m H^T + R)^{-1}, \quad (11)$$

$$x_p = x_m + K(z - H x_m), \quad (12)$$

$$P_p = (P_m^{-1} + H^T R^{-1} H)^{-1}. \quad (13)$$

In these equations, the subscript m represents an a priori estimate and the subscript p represents an a posteriori estimate. The quantity x is the state variable that may take a variety of forms. Because the exemplary ADM system measures at a high rate, a relatively simple state vector containing only two components—the position d and radial speed v—are needed:

$$x = \begin{pmatrix} d \\ v \end{pmatrix}. \quad (14)$$

The corresponding time propagation matrix, assuming unit time steps, is $$\Phi = \begin{pmatrix} 1 & 1 \\ 0 & 1 \end{pmatrix}. \quad (15)$$

Equation (9) then corresponds to the equations $d_m = d_p + v_p$, which means that the estimated distance at the present point in time ($d_m$) is equal to the estimated distance at the last point in time ($d_p$) times the estimated speed at the last point in time ($v_p$) times the time interval between the current and last points in time, which is assumed to equal one. The matrix Q is the process noise covariance. In the simple Kalman filter employed here, the acceleration is not explicitly calculated. Instead the acceleration is assumed to have a dispersion characterized by the variance $\sigma_A^2$. The process-noise variance $\sigma_A^2$ is selected so as to minimize the error in the position of a moving target. The resulting covariance for the process noise is $$Q = \sigma_A^2 \begin{pmatrix} 1/4 & 1/2 \\ 1/2 & 1 \end{pmatrix}. \quad (16)$$

$P_m$ is the state covariance matrix at the present point in time. It is found from the state covariance matrix at the last point in time and the process noise covariance. The state covariance matrix and the measurement noise covariance R are used to determine the filter gain K. In the simple case considered here, the measurement noise covariance is just the variance $\sigma_M^2$ in readings caused by noise in the measurement device. In this case, the measurement noise in the ADM system is determined by simply calculating the variance $\sigma_{ADM}^2$ in the distances reported while the ADM is measuring a stationary target. H is the measurement matrix, which is defined such that H times the state estimate x is equal to the estimated output, against which measured output, is compared. In the case considered here the measurements are of the distance d and so H=(1 0).

Equation (12) is interpreted as follows. $x_m$ is the initial guess for the state vector (distance and radial speed) based on the distance and radial speed for the previous point in time. The quantity z is the measured distance d and $Hx_m$ is the estimated distance. The quantity $z-Hx_m$ is the difference between the measured and estimated distances. This difference is multiplied by the gain matrix K to provide an adjustment to the initial estimate $x_m$ for the state matrix. In other words, the best estimate for the distance is a value between the measured distance and the estimated distance. Equation (12) provides a mathematically sound method of selecting the best (a posteriori) estimate of the distance and radial speed. Equation (13) provides a new estimate for the state covariance $P_p$ at the next point in time. Equations (9)-(13) are solved each time compensator function 422 sends a new measured value to the Kalman filter.

To synchronize the ADM measurement to the measurements of the angular encoders and position detector, counter 414 determines the difference in time between the sync pulse and the last state distance. It does this in the following way. Crystal oscillator 404 sends a low-frequency sine wave to frequency divider 452, located within microprocessor 450. This clock frequency is divided down to $f_{SYNC}$, the frequency of the sync pulse. The sync pulse is sent over device bus 72 to DSP 410, angular encoder electronics 74, and position-detector electronics 76. In an exemplary system, the oscillator sends a 32.768 kHz signal through frequency divider 452, which divides by 32 to produce a sync-pulse frequency $f_{SYNC}$=1.024 kHz. The sync pulse is sent to counter 414, which resides within DSP 410. The counter is clocked by crystal 402, which drives a phase-locked loop (PLL) device 412 within the DSP. In the exemplary system, oscillator 402 has a frequency of 30 MHz and PLL 412 doubles this to produce a clock signal of 60 MHz to counter 414. The counter 414 determines the arrival of the sync pulse to a resolution of 1/60 MHz=16.7 nanoseconds. The phase-extractor function 420 sends a signal to the counter when the ADC 322 has sent all the samples for one cycle. This resets counter 414 and begins a new count. The sync pulse stops the counting of counter 412. The total number of counts is divided by the frequency to determine the elapsed time. Since the time interval in the above equations was set to one, the normalized time interval $t_{NORM}$ is the elapsed time divided by the time interval. The state distance $X_{EXT}$ extrapolated to the sync pulse event is $$x_{EXT} = x_k + v_k t_{NORM}. \quad (17)$$

The Kalman-filter function 424 provides the result, which is the distance from the tracker to external retroreflector 26. The Kalman filter also provides the velocity to phase-extractor function 420 to apply in equations (2), (3), (5), and (6).

Previously the quantity W was introduced in equation (8) as an integer that accounts for the number of whole modulation intervals to the target. This integer value W is found by first measuring the distance to the external retroreflector 26. The frequencies $f_{RF}$ and $f_{LO}$ are changed by a fixed amount and the distances are again measured. If the RF frequencies before and after the change are $f_1$ and $f_2$ and the phase difference between the two measurements is p then the integer W is equal to the integer portion of $(p/2\pi)(f_1/|f_2-f_1|)$. This technique will work out to a range of $(c/2n)/(f_2-f_1)$. For example, if $f_1$ and $f_2$ differ by 2.5 MHz, and if the $f_1$ is 2800 MHz, then the technique will work out to about 60 meters. If desired, a third frequency can be added to assist in determining the value of the integer W. Once W has been determined, it is not necessary to switch the frequencies again unless the beam is broken. If the ADM continues to measure the external retroreflector 26 without interruption, then it can easily keep track of the changes in the integer W.

It will be apparent to those skilled in the art that, while exemplary embodiments have been shown and described, various modifications and variations can be made to the apparatus and method of measuring a moving retroreflector with an absolute distance meter disclosed herein without departing from the spirit or scope of the invention. Accordingly, it is to be understood that the various embodiments have been described by way of illustration and not limitation.

The invention claimed is:

1. A laser device capable of one dimensional absolute distance measurement of a moving external retroreflector or other moving target surfaces without using an incremental interferometer comprising:
   a source of laser light that is amplitude or intensity modulated and sent to and returned from the moving external retroreflector or other moving target surfaces to the laser device along a measurement path;
   an opto-electronic component to convert the laser light returned from the retroreflector or target surfaces along the measurement path into an electrical signal;
   conditioning electronics for conditioning the first electrical signal to create a second electrical signal;
   digitizing electronics to produce digitized values of the second electrical signal;
   a digital signal processor for receiving the digitized values of the second electrical signal wherein the digital signal processor comprises at least a phase extractor module structured to execute a velocity dependant phase extractor function upon the digitized values and wherein the digital signal processor calculates an absolute distance d to the moving retroreflector or other target moving at a velocity v.

2. The laser device of claim 1 further comprising:
   a position detector for assisting in aiming the laser tracker by measuring the position of the returned laser light from the moving external retroreflector or other moving target surfaces.

3. The laser device of claim 2 further comprising:
   reference beam optical components for directing part of the laser light to the measurement path containing the moving external retroreflector or other moving target surfaces and part of the laser light to a separate reference path.

4. The laser device of claim 3 further comprising opto-electronic components to convert said laser light in said measurement path into an RF measurement signal and to convert said laser light in said reference path into an RF reference signal, where said RF measurement signal and said RF reference signal are electrical signals that retain modulation at a first frequency $f_{RF}$; and further comprising additional conditioning electronics for conditioning the RF measurement signal to create an IF measurement signal and for conditioning the RF reference signal to create an IF reference signal.

5. The laser device of claim 4 further comprising additional digitizing electronics to produce digitized values of said IF measurement signal and IF reference signal at a third frequency $f_{SAMP}$, which is a multiple of second frequency $f_{IF}$ and wherein the data processor calculates the absolute distance d to the retroreflector or other moving target surface moving at velocity v in air having index of refraction n, speed in vacuum c, and integer ratio $V=f_{SAMP}/f_{IF}$ from said digitized values $X_k$ of said IF measurement signal and said digitized values $Y_k$ of said IF reference signal using the following formulas, $$R_{MOD} = c/(2nf_{RF}),$$

$$a = \sum_{k=0}^{V-1} x_k \sin\left(2\pi k \frac{f_{IF} - v/R_{MOD}}{f_{SAMP}}\right),$$

$$b = \sum_{k=0}^{V-1} x_k \cos\left(2\pi k \frac{f_{IF} - v/R_{MOD}}{f_{SAMP}}\right),$$

-continued $$p_M = \tan^{-1}(a/b),$$

$$g = \sum_{k=0}^{V-1} y_k \sin\left(2\pi k \frac{f_{IF}}{f_{SAMP}}\right),$$

$$h = \sum_{k=0}^{V-1} y_k \cos\left(2\pi k \frac{f_{IF}}{f_{SAMP}}\right),$$

$$p_R = \tan^{-1}(g/h),$$

$$d = d_0 + R_{MOD}[W + (p_M - p_R)/2\pi],$$

where $d_0$ is a constant and W is an integer that accounts for the number of whole modulation lengths $R_{MOD}$ to said retroreflector.

6. The laser device of claim 1 further comprising:
   a beam-steering mechanism that directs the laser light sent out of the laser tracker; and
   a position detector that monitors the position of the laser light relative to a retrace point on the position detector and wherein the beam-steering mechanism adjusts the direction of the laser light according to position data from the position detector.

7. The laser device of claim 1 further comprising synchronization electronics which determine a timing of absolute distance measurements relative to an electrical synchronization signal.

8. The laser device of claim 7 wherein the digital signal processor processes a Kalman filter to synchronize the absolute distance measurements with position detector measurements from a position detector and to provide an estimation of distance and speed of the moving external retroreflector or other moving target surfaces as a function of time and in the presence of noise.

9. A laser device capable of one dimensional absolute distance measurement of a moving external retroreflector or other moving target surfaces without using an incremental interferometer comprising:
   a source of laser light that is amplitude or intensity modulated and sent to and returned from the moving external retroreflector or other moving target surfaces to the laser device along a measurement path;
   an opto-electronic component to convert the laser light returned from the retroreflector or target surfaces along the measurement path into an electrical signal;
   digitizing electronics to produce digitized values of the electrical signal;
   a position detector;
   a digital signal processor for receiving the digitized values of the electrical signal wherein the digital signal processor calculates an absolute distance d to the moving retroreflector or other target moving at a velocity v and executes a velocity dependant phase extractor function upon the digitized values; and
   wherein the digital signal processor during the calculation also processes a Kalman filter to synchronize the absolute distance d measurements with position detector measurements from the position detector and to provide an estimation of distance and speed of the moving external retroreflector or other moving target surfaces as a function of time and in the presence of noise.

10. A method capable of one dimensional absolute distance measurement of a moving external retroreflector or other moving target surfaces without using an incremental interferometer comprising:

sending and returning a source of laser light that is amplitude or intensity modulated and sent to and returned from the moving external retroreflector or other moving target surfaces to the laser device along a measurement path;

converting the laser light returned from the retroreflector or target surfaces along the measurement path into a first electrical signal;

conditioning the first electrical signal to create a second electrical signal;

digitizing values of the second electrical signal;

receiving the digitized values of the second electrical signal;

executing a velocity dependant phase extractor function upon the digitized values; and calculating an absolute distance d to the moving retroreflector or other target moving at a velocity v.

* * * * *

UNITED STATES PATENT AND TRADEMARK OFFICE
CERTIFICATE OF CORRECTION

| | | |
|---|---|---|
| PATENT NO. | : 7,701,559 B2 | Page 1 of 1 |
| APPLICATION NO. | : 11/756251 | |
| DATED | : April 20, 2010 | |
| INVENTOR(S) | : Bridges et al. | |

It is certified that error appears in the above-identified patent and that said Letters Patent is hereby corrected as shown below:

Column 9:
Line 26, change "tracker" to -- device -- after "laser"

Column 10:
Line 20, change "tracker" to -- device -- after "laser" and before "; and"

Signed and Sealed this
First Day of February, 2011

David J. Kappos
*Director of the United States Patent and Trademark Office*